Figure 1:
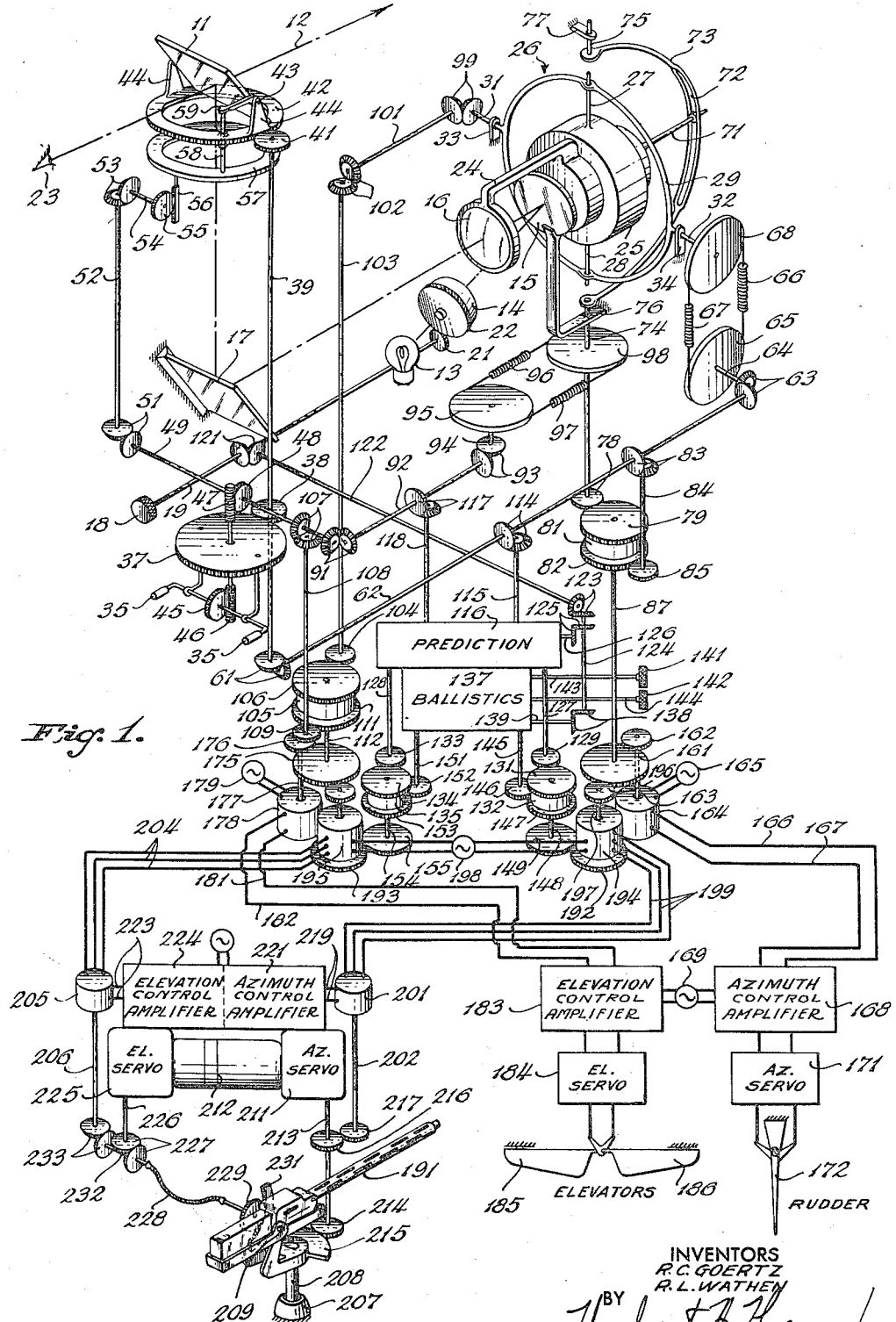

INVENTORS
R. C. GOERTZ
R. L. WATHEN
BY
Herbert H. Thompson
THEIR ATTORNEY

United States Patent Office 2,724,998
Patented Nov. 29, 1955

2,724,998

POSITIONAL CONTROL APPARATUS

Raymond C. Goertz and Robert L. Wathen, Hempstead, N. Y., assignors to Sperry Rand Corporation, a corporation of Delaware Application July 20, 1943, Serial No. 495,418

24 Claims. (Cl. 89—41)

This invention relates, generally, to positional control apparatus for moving objects to a position corresponding to a signal representing the desired position or to signal representing the displacement of an object relative to a reference position. The invention particularly concerns positioning an object on a support and, at the same time, positioning the support, both the object and the support being positioned by the same signal.

It is frequently desirable to position a small object on a relatively large support and at the same time position a support, or to have the support follow movements of the object. With such an arrangement, it is possible to increase the sensitiveness, accuracy, and speed of response by using a relatively small and quick-acting power system for positioning the object on the support, and a larger slower system for positioning the heavier support.

One example in which a positional control system of this type may be used to advantage is in gun aiming apparatus. The invention is particularly useful in connection with aiming guns on aircraft. This may be accomplished by producing a signal corresponding to a desired gun position, then first, moving the gun quickly to the desired position, and second, operating an automatic pilot to direct the craft toward the same position. The guns and the automatic pilot are controlled by the same signal, but the automatic pilot mechanism is slower to respond to the signal.

A major object of the invention is to provide positional control apparatus for positioning an object by controlling both the position of the object and its support.

Another object of the invention is to provide a positional control system for a light object carried by a heavy support, in which separate driving means responsive to the same signal are used to position the object and the support.

A further object of the invention is to provide positional control apparatus for aircraft in which an object on the aircraft is positioned by a servo mechanism in accordance with a certain signal, and an automatic pilot responds to the same signal to direct the aircraft to a corresponding position.

A further object of the invention is to provide positional control apparatus for aiming a gun on a support by producing a signal corresponding to the desired gun angle, and positioning the gun and the support according to the signal.

A still further object of the invention is to provide gun aiming apparatus for aircraft in which the gun is positioned by a servo mechanism in accordance with a signal corresponding to the desired gun aiming angle, and an automatic pilot directs the aircraft toward a corresponding position.

Other objects and advantages of the invention will become apparent from the following specification taken in connection with the accompanying drawings, wherein Fig. 1 is a perspective schematic diagram showing the invention embodied in gun aiming apparatus for aircraft that is controlled by an optical sight.

Figure 2:
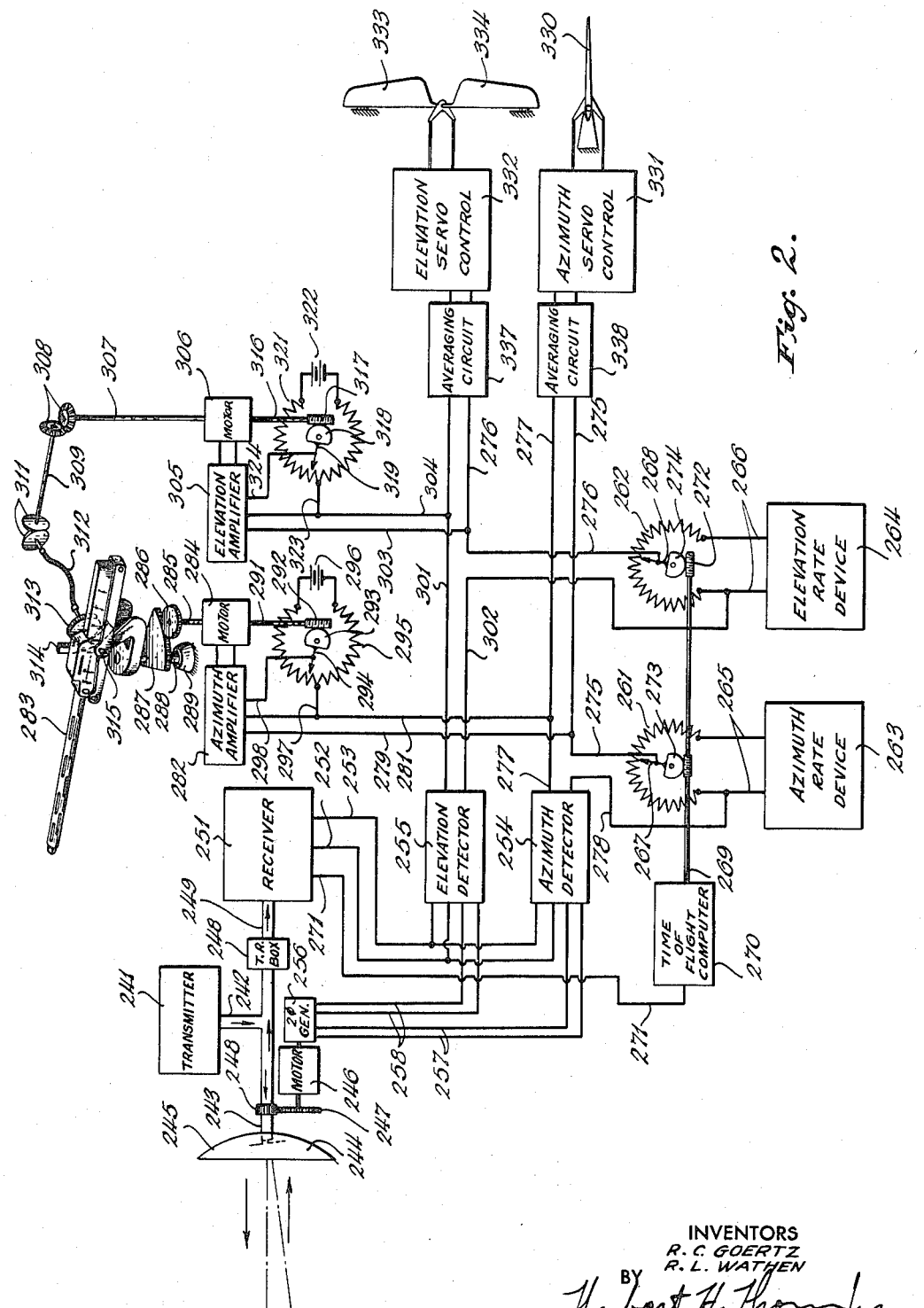

Fig. 2 is a schematic diagram of the invention embodied in gun aiming apparatus for aircraft controlled by a radio sight.

The use of the invention, as shown in the drawings to aim guns on aircraft, is intended merely as an illustration of the invention, as the invention is not limited to such a use.

The invention is particularly useful for aiming guns on pursuit or attack type aircraft. Originally the guns on this type of aircraft were fixed to the craft and the pilot maneuvered the craft until the gun sight was on the target.

Computing sights have been added which off-set the line of sight relative to the axis of the craft, but the pilot continues to maneuver his plane until the target appears in the sight. With this type of hight, the computing mechanism off-sets the line of sight by a lead angle, whereupon the pilot actually causes the aircraft to fly toward a predicted future position of the target. It has now been proposed to provide attack or pursuit type aircraft with slightly movable guns which may be off-set in accordance with the lead angle to direct them toward the predicted future position of a target.

All of the prior systems here depended upon either a fixed line of sight or a fixed gun angle. In such systems it is necessary to control the plane so it will either fly along the line of sight or toward the predicted future position of the target as determined by the angle at which the guns are aimed. Since the controls of the plane are inherently slow responsive devices, it has been difficult to train the guns on a target. For these reasons, is is desirable to have both the line of sight and the guns movable relative to the aircraft to facilitate tracking a target and to eliminate the necessity for controlling the guns entirely by maneuvering the aircraft. The present invention makes it possible to fly the aircraft in the general direction of a target, adjust the line of sight directly onto the target, and position the guns in accordance with the adjusted line of sight. A prediction angle may be added, if desired.

Omitting the prediction angle for present considerations; the line of sight is tracked with the target and the guns are positioned on the aircraft in accordance with the position of the line of sight. Since the guns are relatively light, small quick acting servo mechanisms may be used to position the guns in accordance with the line of sight. Subsequently the automatic pilot may act to direct the aircraft toward the line of sight so it will fly toward the target. However, it is not necessary to wait for the comparatively sluggish controls of the aircraft to maneuver the plane before firing the gun.

If a prediction angle is added, the guns are off-set relative to the line of sight in accordance with a computed prediction angle to direct them toward a predicted future position of the target. Here again the guns are off-set relative to the line of sight, which in turn may be moved relative to the aircraft. In such a situation it is possible to direct the craft along the line of sight and off-set the guns by the computed lead angle, or to direct the craft toward the future position of the target.

In the embodiment of the invention shown in Fig. 1, an optical sight is mounted on the aircraft and adjusted to track a target. A servo mechanism operates the guns in accordance with the correction angle to off-set them relative to the line of sight. An automatic pilot is actuated to direct the craft toward the line of sight. The servo mechanism for positioning the guns is very sensitive and continually positions them relative to the line of sight, thus avoiding errors due to the lag of the automatic pilot system and the aircraft's controls.

The sight shown in Fig. 1 includes stabilized optics and is of the reflex type, in which the image of a reticle appears focussed at infinity in a sighting member 11 to define a line of sight 12. Light from a source such as electric bulb 13 is directed through a variable reticle 14 to a stationary reflector 15 which reflects the image of reticle through a lens 16 to another reflector 17. The diameter of the circular reticle 14 is variable by operation of a knob 18 which operates through a shaft 19 and gearing 21, 22 to vary the diameter of the reticle. The circularly formed reticle 14 is focussed at infinity by the lens 16 and directed by the reflector 17 through the sighting member 11. Hence, an image of the reticle as seen from the observer's eye 23 is focussed at infinity and the sight may be adjusted until the reticle image appears superimposed upon a target.

The focussing lens 16 is mounted by a bracket 24 on the casing of rotor 25 of a free gyro, indicated generally at 26. The rotor 25 is supported for movement about a vertical axis by shafts 27, 28 which are journalled in a gimbal ring 29 that is carried for movement about a horizontal axis by shafts 31 and 32 mounted in stationary bearings 33 and 34 that are fixed on the aircraft. Since the gyro rotor 25 will normally remain stationary in space, the image of the reticle formed by the lens 16 is stabilized so it will not move during changes in attitude of the aircraft.

The diameter of the reticle may be varied to maintain its image coincident with the outside dimensions of the target to provide a measure of the range of the target. The position of the knob 18 is adjusted to adjust the reticle and thereby provides a measure of the range of the target.

In tracking a target the operator positions handle bars 35 about vertical and horizontal axes to maintain the image of the reticle as it appears in the sighting member 11 on a target, to determine the position of the line of sight 12. The tracking apparatus shown in the drawing provides aided tracking. Torques are applied to the gyro to cause its spin axis to follow movements of the target. The torques applied correspond to the angular rates of movement of the target, since the precession rates of the gyro are proportional to the torques applied. Aided tracking is accomplished by off-setting the optical member 11 about horizontal and vertical axes in accordance with the displacement of the handle bars 35.

In tracking in azimuth, rotation of the handle bars 35 about a vertical axis rotates gear 37 which drives through a gear 38 on shaft 39 to rotate pinion 41 that meshes with a gear 42 to displace the optical member 11 in azimuth according to the displacement of the handle bars 35 about the vertical axis. The optical member 11 is carried for rotation about a horizontal axis by shaft 43 and projections 44, 44 on the ring gear 42. Rotation of the handle bars 35 about a horizontal axis acts through pinion 45, racks 46 and 47, and pinion 48 to rotate shaft 49 which drives through gearing 51, shaft 52, gearing 53 and shaft 54 to rotate pinion 55. The pinion 55 positions rack 56 in accordance with the displacement of the handle bars. The rack 56 moves a lift ring 57 in a vertical direction which engages a pin 58 that rotates arm 59 to adjust the position of the sighting member 11 about the horizontal axis of shafts 43. It should be apparent from the description, that the line of sight is displaced an amount proportional to the displacement of the handle bars about two independent axes.

Displacement of the handle bars about a vertical axis, as already stated, rotates shaft 39. The shaft 39 drives through gearing 61, shaft 62, gearing 63 and shaft 64 to rotate a pulley 65, which is connected by springs 66 and 67 to a pulley 68 on the shaft 32. Thus, rotation of the handle bars 35 about a vertical axis applies a torque to the horizontal axis by shaft 32 causing the gyro rotor 25 to precess about the axis of shafts 27 and 28. This precession of the gyro is transmitted by a shaft 71 on the rotor to a bracket 73 by engagement in a slot 72. The bracket 73 is mounted on vertical shafts 74 and 75 which are journalled in members 76 and 77 mounted rigidly on the craft.

As the gyro precesses, it rotates shaft 74 which drives pinion 78 meshing with gearing 79 on one input of a differential 81. The other input of the differential 81, as represented by gearing 82, is driven directly from shaft 62 by gearing 83 and shaft 84 which rotates pinion 85 meshing with gear 82. The output of the differential as represented by shaft 87 corresponds to the position of the line of sight 12 relative to the aircraft, since it is the sum of the displacement of the line of sight relative to the gyro spin axis and the displacement of the gyro spin axis relative to the aircraft. This angle may be referred to as the observed azimuth angle since it is the azimuth angle of the target relative to the aircraft.

In the same manner, rotation of the handle bars 35 about a horizontal axis rotates shaft 49 which drives through gearing 91 to rotate shaft 92. The shaft 92 drives through gearing 93 and shaft 94 to rotate pulley 95. The pulley 95 is connected by springs 96 and 97 to a pulley 98 on the shaft 74 which applies a torque to the vertical axis of the gyro to cause it to precess about the horizontal axis of shafts 31 and 32. As it precesses its movement about the horizontal axis is transmitted by shaft 31, gearing 99, shaft 101, gearing 102, shaft 103, and pinion 104 to one input of a differential 105, as represented by gear 106. The other input of the differential 105 is driven directly through the shaft 49 by gearing 107, shaft 108, and pinion 109, which meshes with gear 111 forming the second input of the differential 105.

Precession movements of the gyro about the axes defined by shafts 74, 75 and 31, 32 will not directly affect or cause corresponding movements of the sight or the line of sight 12 through the connections therebetween which include the pulleys 95, 98 or 65, 68 and connecting springs, shafts and gearing. The reason for this may be understood from the following. Assume that the gyro is caused to precess about the axes thereof defined by shafts 74, 75 or 27, 28 by virtue of movement of the handle bars 35 about a vertical axis. Motion from shaft 74, which is driven by the gyro, will not be imparted to the sight because of the fact that the handle bars are connected into the system therebetween and in order to permit of transmission of such movement from one device to the other, the handle bars must necessarily be released. When the handle bars are released, of course, the gyro will no longer precess. However, under normal operating conditions in tracking a target, the handle bars are displaced about either their vertical or horizontal axes or both to some degree, the extent of displacement from a central or neutral position being a measure of the rate of precession of the gyro. Since the guns and the craft are controlled from the output of the gyro to follow movements thereof in aiming the guns or controlling the direction of flight of the plane toward the target, the gyro will experience very little movement relative to the guns or the aircraft, and such movement will not be transmitted through the mechanical connection between the gyro and sight beyond the point of interconnection therewith of the handle bars, the springs and their connections to the pulleys 65, 68 and 95, 98 of the torque exerting devices permitting relative movement therebetween.

Output shaft 112 of the differential 105 is positioned in accordance with the sum of the vertical angle of the gyro spin axis relative to the aircraft and the vertical angle of the line of sight 12 relative to the spin axis of the gyro. The sum of these two angles corresponds to the observed elevation angle of the target relative to the aircraft.

Since the angular displacements of the shafts 62 and 92 represent the torques applied to the horizontal and vertical axes of the gyro, respectively, the positions of those shafts correspond to the azimuth and elevation angular rates of movement of the target. The azimuth angular rate is supplied by gearing 114 and shaft 115 to a prediction mechanism 116. The elevation angular rate is supplied from the shaft 92 by gearing 117 and shaft 118 to the prediction mechanism 116.

The prediction mechanism 116 may be of any suitable well known design which includes a device for computing the time of flight of a projectile to the target in accordance with the range of the target. For this purpose, a measure of the range of the target as determined by knob 18 and shaft 19 is supplied by gearing 121, shaft 122, gearing 123, shaft 124, gearing 125 and shaft 126 to the prediction mechanism 116. The prediction mechanism should also preferably include apparatus for combining the azimuth and elevation angular rates with the time of flight to provide azimuth and elevation prediction angles. The azimuth and elevation prediction angles may be represented by the positions of shafts 127 and 128 from the prediction mechanism.

A pinion 129 on the shaft 127 meshes with a gear 131 forming one input of a differential 132 to supply the azimuth prediction angle to the differential. Similarly, the shaft 128 rotates a pinion 133 which meshes with a gear 134 forming one input of a differential 135.

In addition to determining prediction angles, it is also desirable to determine ballistic correction angles in order to compute proper lead angles by which the gun should be off-set relative to the line of sight. A ballistic correction mechanism 137 of any conventional design may be supplied with data corresponding to the range of the target from shaft 124 by gearing 138, which drives shaft 139 to the ballistic mechanism 137. Values of indicated airspeed and altitude may be supplied by knobs 141 and 142, respectively, which rotate shafts 143 and 144.

The azimuth ballistic correction angle, as computed by the ballistic correction mechanism 137 in the form of an angular rotation of shaft 145, drives a pinion 146 meshing with gear 147 forming a second input of the differential 132. The differential 132 combines the azimuth prediction and ballistic angles so its output shaft 148 is rotated in accordance with the azimuth lead angle and rotates pinion 149 in accordance with this lead angle.

In a similar manner shaft 151 rotates pinion 152 in accordance with the elevation ballistic correction angle. The pinion 152 meshes with gear 153 forming a second input of the differential 135, which combines the elevation prediction and ballistics angles. Output shaft 154 of the differential 135 is thereby positioned in accordance with the elevation lead angle and rotates pinion 155 in accordance with the lead angle.

As has already been described, shaft 87 is positioned in accordance with the sum of the azimuth angles of the gyro spin axis and the sighting member 11, which corresponds to the azimuth angular position of the line of sight. In this manner, the position of shaft 87 provides a mechanical signal corresponding to the position of the line of sight 12 relative to the aircraft. Rotation of shaft 87 rotates pinion 161 which drives through gear 162 to rotate shaft 163 which positions a movable element of a suitable signal generator 164 that is energized from a source of electrical power 165. The mechanical signal which is represented by rotation of shaft 87, is converted to an electrical signal by the generator 164, and is transmitted by leads 166 and 167 to the azimuth control 168 of an automatic pilot.

We have herein shown and described only those parts of a conventional automatic pilot which may function in combination with other elements of the present invention to provide control over the direction of flight of the craft in response to movements of the sights. For example, the azimuth control or amplifier which controls the azimuth servo, which in turn controls the rudder thereby controlling the movement of the craft about its azimuth axis, is shown as connected to receive the electrical signal from the signal generator 164. Similarly, as hereinafter more particularly described, the elevation control or elevator amplifier, which controls the elevator servos operating the elevators of the aircraft to control its movement about its pitch axis, is connected to receive the electrical signals supplied by a second signal generator which converts the mechanical displacement signals or the angular position of the line of sight in elevation into an electrical signal.

The azimuth control 168 may be connected to a suitable source of electrical energy 169 for controlling a servo mechanism 171, which adjusts rudder 172 of the craft. The signal corresponding to the azimuth angular position of the line of sight relative to the craft actuates the azimuth control 168 of the automatic pilot which operates the rudder servo mechanism 171 to position the rudder to direct the craft toward the line of sight. As the craft approaches the line of sight the signal is decreased, and when the craft's longitudinal axis and the line of sight are coincident the signal of generator 164 is zero.

In a similar manner the mechanical signal of shaft 112 corresponding to the elevation angular position of the line of sight rotates pinion 175 which meshes with gear 176 to rotate shaft 177 that positions the rotor of a suitable signal generator 178 in accordance with the elevation angular position of the line of sight 12. The generator 178 is energized by a suitable source 179 and converts the mechanical signal of shaft 112 to an electrical signal which is transmitted by leads 181 and 182 to elevation control 183 of the automatic pilot. The elevation control operates servo motor 184, which positions the elevators 185 and 186 of the aircraft to direct it toward the line of sight.

As previously explained, operation of the automatic pilot and the aircraft control is slow, which makes it difficult for the operator to accurately track a target. Since the line of sight 12 is adjustable relative to the aircraft, it is desirable to position gun 191 in accordance with the position of the line of sight, and also to off-set the gun relative to the line of sight in accordance with the computed lead angles. Pinions 149 and 155 are rotated to represent mechanical signals corresponding to the azimuth and elevation lead angles. These pinions mesh with gears 192 and 193 to rotate the stator windings of suitable position transmitters 194 and 195, which may be of any conventional type such as Selsyns, Telegons, or Autosyns.

The rotor of position transmitter 194 is rotated in accordance with the azimuth angle of the line of sight relative to the aircraft by a shaft 197 driven by gear 196. Both transmitters 194 and 195 are supplied with energy from a suitable electrical source 198. Since the rotor of transmitter 194 is rotated in accordance with the azimuth angle of the line of sight, and the stator is positioned in accordance with the azimuth prediction angle, an electrical signal corresponding to the desired gun position angle is produced on leads 199 and is transmitted thereby to a suitable receiver 201, the rotor of which is positioned by a shaft 202 in accordance with the azimuth angular position of the gun 191 in a manner subsequently to be described.

Likewise, the rotor and stator of position transmitter 195 is rotated in accordance with the elevation angle of the line of sight and the elevation prediction angle to produce a signal corresponding to the desired elevation gun aiming angle which is transmitted by leads 204 to a receiver 205, the rotor of which is positioned by shaft 206 in accordance with the elevation angle of the gun 191.

The gun 191 is mounted in a suitable support 207 on the aircraft for movement about two independent axes. It is supported for rotation in azimuth by a shaft 208, and is also movable in elevation about the horizontal axis of shaft 209. Movements in azimuth are effected by the azimuth servomotor 211 of a suitable driving mechanism 212 which may be of any suitable type. The azimuth servomotor 211 rotates shaft 213 which drives through pinion 214 and sector gear 215 to rotate the gun 191 in azimuth. The azimuth position of the gun, as determined by shaft 213, is supplied through pinion 216 and gear 217 which rotates shaft 202 to position the rotor of receiver 201 in accordance with the azimuth position of the gun.

As is well known, in transmission systems of the type herein described the signal of the rotor of receiver 201, as represented by leads 219, corresponds to the displacement between the rotors in the transmitter and receiver. This signal acts through azimuth control amplifier 221 to operate azimuth motor 211 which moves the gun until the position of the rotor on the shaft 202 corresponds to the elevation position of the rotor and stator in the transmitter 194, that is, the sum of the rotation of shafts 148 and 197.

Elevation receiver 205 produces a signal which is connected by leads 223 corresponding to the displacement of the rotors in the transmitter and receiver that actuates elevation control amplifier 224 to control elevation servomotor 225. The elevation servomotor 225 drives through shaft 226, gearing 227, and flexible shaft 228 to rotate pinion 229 that meshes with sector 231 to adjust the elevation position of the gun 191. The elevation position of the gun 191 is supplied by shaft 232 connected directly to the flexible shaft 228 and through gearing 233 which rotates the shaft 206.

From the foregoing description it will be apparent that the gun is constantly positioned about two axes in accordance with the position of the line of sight, compensation being made for a proper lead angle. Signals corresponding to the position of the line of sight are supplied to the automatic pilot, which operates servomotors to position the rudder and elevator control surfaces which direct the aircraft toward the line of sight. Obviously, the aircraft represents any movable support for the gun and any other object desired to be controlled could be substituted for the gun. The pitch and turn axes of the aircraft correspond generally to the elevation and azimuth axes of the gun mounting. Thus, signals corresponding to the desired position of the gun or object are supplied to control mechanisms including servomotors which quickly position the object or gun about two axes according to the signal and more slowly position the support or aircraft about corresponding axes according to the same signal.

When the gun has been moved to its desired position, the signal supplied to the motors for moving the gun is zero. As the craft continues to move toward the line of sight, the angle between the line of sight and the aircraft is reduced so the angle between the gun and the aircraft must also be reduced. This is accomplished automatically by the inherent operation of the gyro. The gyro remains stationary in space and stabilizes the line of sight. As the plane moves toward the line of sight, it changes its angular position relative to the gyro, and thus changes the signals controlled by the gyro. These signals operate the gun control motor to keep it at a constant angle relative to the gyro, that is, the line of sight. Similarly, the the plane approaches the line of sight, the signals supplied to the automatic pilot are reduced and the control surfaces gradually returned to their neutral position.

Fig. 1 illustrates the preferred form of the invention embodied in a control system for aiming a gun on an aircraft. Stabilized optics and aided tracking features have been added to provide a complete system. However, other applications of the invention are contemplated, and the illustration as applied to gun aiming apparatus is not intended to limit the scope of the invention.

Another embodiment of the invention is shown in Fig. 2, in which a radio sight is substituted for an optical sight. Since automatic tracking is possible with a radio sight, it is unnecessary to stabilize the line of sight. Radio sights are becoming well known in the fire control art, and any suitable type of radio sight may be used in the apparatus shown in Fig. 2. The invention as embodied in this apparatus concerns a completely automatic apparatus for positioning an object on a movable support or platform, and also positioning the platform automatically in accordance with signals from a source of radiant energy.

The radio sight includes a transmitter 241 that may be connected by suitable wave guides 242 and 243 to an antenna 244 having a parabolic reflector 245 for projecting a directional beam pattern of radiant energy into space. The axis of the antenna 244 is off-set relative to the axis of the parabola 245.

A motor 246 drives through suitable gears 247 and 248 to continuously rotate the antenna 244 thereby projecting a conical beam pattern of radiant energy into space. Energy projected by the antenna 244 may be reflected by an object or target within its beam pattern. This energy is received by the antenna 244 and supplied through wave guide 243 to a T-R box 248, the purpose of which is to block the relatively high power of the transmitted energy and to pass only the lower power signals of the received energy. The received energy is then conducted by wave guide 249 to a receiver 251 where it is converted to signals which may be supplied by leads 252 and 253 to azimuth and elevation phase detector circuits 254 and 255, respectively. A two-phase generator 256 having one phase connected by lead 257 to the azimuth detector 254 and another phase connected by lead 258 to elevation detector 255 is rotated by the motor 246 synchronously with rotation of the antenna 244.

The azimuth phase detector 254 compares the signals from the receiver 251 with the signals from the generator 256 to produce direct current voltages having a polarity and magnitude corresponding of the displacement of the target relative to the axis of the parabola 245. These signals correspond to the displacement of the line of sight relative to the axis of the parabola. Usually the axis of the parabola is coincident with the longitudinal axis of the aircraft, so these signals correspond to the azimuth position of the line of sight relative to the aircraft. Similar signals are produced by the elevation detector 255, the signals having a polarity and magnitude corresponding to the elevation angular position of the line of sight relative to the aircraft.

Signals corresponding to the lead angle may be combined with the azimuth and elevation signals to position the gun. These lead angle signals may be produced electrically by applying voltages across potentiometers 261 and 262 corresponding to the azimuth and elevation angular rates of movement of the target. Such rate signals may be obtained by conventional azimuth and elevation rate devices 263 and 264 which may be of any suitable type such as rate gyros or other rate devices that measure the angular rates of movement of the aircraft to determine the angular rates of movement oft he line of sight. These devices should supply direct current voltages as by leads 265 and 266 across potentiometers 261 and 262. Sliders 267 and 268 of the respective potentiometers are rotated in accordance with the time of flight of a projectile to the target by a shaft 269 that is driven from a time of flight computer 270. In the embodiment herein shown, shaft 269 drives the sliders 267 and 268 by means of worms and worm wheels. For example, slider 268 of potentiometer 262 is mounted to be rotated by worm wheel 274 which meshes with worm 272 secured on shaft 269 and adapted to rotate therewith. Similarly, slider 267 of potentiometer 261 is mounted to be rotated by worm wheel 273 which meshes with a worm, similar to worm 272, which is also mounted on shaft 269 and secured so as to rotate therewith. If desired, the time of flight computer may be supplied with range data from the receiver 251 by a lead 271.

Thus, the voltages of potentiometer sliders 267 and 268 correspond to azimuth and elevation prediction angles. Suitable ballistic corrections may be introduced by tapering the potentiometer windings or by adjusting the position of the windings themselves if desired. In this manner the voltages of leads 275 and 276 correspond to azimuth and elevation lead angles. The voltage of lead 275 is added to the voltage on azimuth detector 254, represented by leads 277 and 278, and the sum of these voltages is connected by leads 279 and 281 to azimuth control amplifier 282.

The voltage outputs of the rate devices have a polarity and magnitude corresponding to the direction and rate of angular movement of the target. It will be apparent, therefore, that the voltage of leads 279 and 281 will vary in polarity and magnitude according to the direction and amount of desired lead angle, as well as the direction and amount by which the line of sight to the target is off-set relative to the axis of the aircraft. It is the combination of these two angles which determines the position of gun 283 relative to the aircraft. Thus, azimuth amplifier 282 operates azimuth servo motor 284 and pinion 286 to rotate sector 287 which positions shaft 288 to adjust the gun in azimuth. The shaft 288 is mounted rotatably in a suitable support 289 on the aircraft.

Azimuth servo motor 284 also drives through shaft 291 to rotate worm gear 292 which meshes with sector 293 to position sliders 294 of a potentiometer 295. A suitable source of voltage as represented by battery 296 is connected across potentiometer 295 and the mid-point of potentiometer 295 is connected by lead 297 to the lead 281. The azimuth amplifier thus causes the motor 284 to run in one direction or another until the polarity and magnitude of the voltage of potentiometer slider 294, which is connected to the amplifier by lead 298, is equal to the voltage of leads 279 and 281.

In a similar manner the elevation position of the gun is determined by combining the voltage from the elevation detector as retpresented by leads 301 and 302 with the voltage of potentiometer slider 268, which is connected by lead 276 in series with the lead 302. This combined voltage, which has a polarity and magnitude corresponding to the desired elevation position of the gun, is supplied by leads 303 and 304 to elevation control amplifier 305. The amplifier 305 controls motor 306 which drives through shaft 307, gearing 308, shaft 309, and gearing 311 to rotate flexible shaft 312 which in turn rotates pinion 313 that meshes with shaft 314 to position the gun about the horizontal axis of pivots 315.

The motor 306 also drives through shaft 316 and worm gear 317 which meshes with sector 318 to position the slider 319 of potentiometer 321 in accordance with the elevation position of the gun. The potentiometer 321 has a voltage as represented by battery 322 connected across its terminals. The mid-point of potentiometer 321 is connected by lead 323 to the lead 304 which forms a neutral connection for the amplifier 305. The potentiometer slider 319 is connected by lead 324 to the amplifier 305. The amplifier 305 causes motor 306 to rotate in one direction or another until the voltage of potentiometer slider 319 corresponds in polarity and magnitude to the voltage of leads 303 and 304.

From the foregoing description it will be apparent that the gun is first positioned in accordance with the elevation and azimuth angular position of the target relative to the aircraft. The gun is also additionally positioned in accordance with computed lead angles. The same signals which control the position of the gun are supplied to the automatic pilot. Thus, rudder 330 is controlled by signals from leads 273 and 275 which actuate azimuth servo control 331 in accordance with the azimuth position of the target and the azimuth prediction angle. Similarly, leads 276 and 301 control the elevation servo system 332 of the automatic pilot in accordance with the elevation position of the target and the elevation prediction angle. The elevation servo system controls elevators 333 and 334 which cause the aircraft to move upwardly or downwardly toward predicted future position of the target.

In some cases it may be desirable to have the automatic pilot operated according to continuing signals, and not respond to small variations in the line of sight due to changes in the altitude of the aircraft. If desired, averaging or integrating circuits 337 and 338 may be connected in the control circuits for the azimuth and elevation servo systems. This will cause the automatic pilot to direct the craft in response to continuing signals, and provide smoother operation of the plane. However, the guns will respond to all signals and be directed toward the target at all times.

The system shown in Fig. 2 determines the line of sight to the target and immediately positions the gun in accordance with the line of sight and operates through the automatic pilot to direct the aircraft toward the line of sight. The introduction of prediction angles upon computation of a time of flight and measurement of angular rates, changes the position of the gun additionally in accordance with the desired lead angle and also supplies additional signals to the automatic pilot for directing the aircraft toward the predicted future position of the target.

In the first system described the gun was positioned in accordance with a desired lead angle and the automatic pilot directed the craft along the line of sight. In the latter system, both the gun and the aircraft are directed toward the future position of the target. Obviously, these features are interchangeable.

The line of sight of the optical sight or the directivity axis of the radio sight or the signal generators supplying a control signal for controlling the servomotors may be considered as defining reference directions or as a controlling reference for positioning the guns or the craft and hence a reference position. For target interception purposes, of course, a prediction angle factor is introduced so that the direction or position of the guns or the craft are offset from the reference provided by the sight with the computed lead angle and are directed toward the future position of the target. Therefore, by the phrase "means defining a reference direction," we refer to those instrumentalities which provide a directional or positional reference for controlling the aiming or positioning of the guns or craft.

The system shown in Fig. 1 may be modified to produce signals which will cause the automatic pilot to direct the craft toward the future position of the target. Likewise, the outputs of azimuth and elevation detectors 254 and 255 (Fig. 2) may be used to control the automatic pilot so it will direct the aircraft along the line of sight.

The latter system illustrates a second embodiment of the invention in controlling guns on aircraft. Here again the aircraft may be considered as a movable support for the guns and any object may be substituted for the guns without departing from the invention. The radio apparatus determines the direction from which signals are received and converts the received signals into signals which position the guns or object on the aircraft that serves as a support. These signals also control devices which position the aircraft or support in the same direction. Since the gun or object is lighter and more easily controlled, it is rapidly positioned by a relatively small and quick-acting servo. The support or aircraft is much larger and gradually positioned in accordance with the signals by a sloweracting servomechanism controlled by the automatic pilot.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for aiming a gun comprising a support movable about two relatively angularly disposed supporting axes, a gun mounted on said support for movement about a pair of relatively angularly disposed axes and relative to said support, a sighting instrument defining a line of sight to a target, control means responsive to said sighting instrument for producing signals corresponding to said line of sight, motor means controlled by said control means for positioning said gun about its two supports, and motor means controlled by said control means for positioning said support about its axes of movement.

2. Apparatus for aiming a gun comprising a support movable about two relatively angularly disposed supporting axes, a gun mounted on said support for movement about a pair of relatively angularly disposed axes and relative to said support, a sighting instrument defining a line of sight to a target, control means responsive to said sighting instrument for producing a signal corresponding to the displacement of said support relative to said line of sight, motor means controlled by said control means for positioning said gun about its two axes of movement, and a motor actuated by said control means for positioning said support.

3. Positional control apparatus for aircraft comprising an object mounted on the aircraft for movement about a pair of axes relative to said aircraft, control means defining a reference direction, motor means controlled by said control means for positioning said object about said two axes, and a motor controlled by said control means for operation the control surfaces of the aircraft.

4. Positional control apparatus for aircraft comprising an object mounted on the aircraft for movement about a pair of axes relative to said aircraft, control means defining a reference direction and including a manual controller, motor means controlled in accordance with movements of said manual controller to move said object about said two axes toward said reference direction, and a motor controlled in accordance with movements of said manual controller to move control surfaces of the aircraft to direct said aircraft toward said reference direction.

5. Positional control apparatus for aircraft comprising an object mounted on the aircraft for movement about a pair of axes relative to said aircraft, a common control including means for producing signals dependent upon the position of said aircraft in space relative to a reference direction, motor means controlled by said signals for positioning said object about said two axes, and a motor controlled by said signals for operating control surfaces to direct the aircraft toward said reference direction.

6. Gun aiming apparatus for aircraft comprising a gun mounted on the aircraft for movement about a pair of axes relative to said aircraft, a sighting instrument defining a line of sight to a target, motor means responsive to the displacement of said aircraft relative to said line of sight for positioning said gun about said two axes, and a motor responsive to the position of said aircraft relative to said line of sight for operating control surfaces of the aircraft.

7. Apparatus for aiming a gun comprising a support, a gun mounted on said support for movement about a pair of axes relative to said support, a sighting instrument defining a line of sight to a target, means for introducing a lead angle for the gun relative to said line of sight, a motor responsive to said sighting instrument and said means for positioning said gun, and a motor actuated by said sighting instrument for positioning said support.

8. Positional control apparatus comprising a control element, a support, an object mounted on said support for movement about a pair of axes relative to said support motor means and controls therefor responsive to displacement between said element and said support for positioning said object about said axes, and a motor responsive to the displacement between said element and said support for moving said support.

9. Positional control apparatus comprising a control element, a support, an object mounted on said support for movement about a pair of relatively angularly disposed axes and relative to said support, control means actuated by said element for producing a signal corresponding to the position of said element relative to said support, motor means controlled by said control means for positioning said object about said two axes, and a motor actuated by said control means for positioning said support.

10. Apparatus for aiming a gun comprising a support, a gun mounted on said support for movement about a pair of relatively angularly disposed axes and relative to said support, a sighting instrument defining a line of sight to a target, control means responsive to said sighting instrument for producing a signal corresponding to the displacement of said sighting instrument relative to said support, motor means controlled by said control means for positioning said gun about said two axes, and a motor controlled by said control means for positioning said support.

11. Apparatus for aiming a gun comprising a support, a gun mounted on said support for movement about a pair of relatively angularly disposed axes and relative to said support, a sighting instrument defining a line of sight to a target, control means responsive to said sighting instrument for producing signals corresponding to the displacement of said sighting instrument relative to said support, means for introducing a lead angle for said gun relative to said line of sight, motor means controlled by said control means and said last-named means for positioning said gun about said two axes, and a motor actuated by said control means for positioning said support.

12. Apparatus for aiming a gun on an aircraft comprising a sighting instrument defining a line of sight to a target, control means for producing a signal corresponding to displacement of said sighting instrument relative to said aircraft, a motor controlled by said control means for positioning said gun relative to said aircraft, a motor controlled by said control means for operating the control surfaces of said aircraft, and means for independently but simultaneously controlling said motors respectively in accordance with the disagreement in angular position of said gun and aircraft position relative to said line of sight.

13. Apparatus for aiming a gun on an aircraft comprising a sighting instrument for defiining a line of sight to a target, control means for producing a signal corresponding to displacement of said sighting instrument relative to said aircraft, means for introducing the lead angle for said gun to said line of sight, a motor controlled by said control means and said last-named means for positioning said gun, and a motor controlled by said control means for operating the control surfaces of said aircraft.

14. Apparatus for aiming a gun comprising a support, a gun mounted on said support for movement about a pair of relatively angularly disposed axes and relative to said support, a sighting instrument defining a line of sight to a target, control means for producing signals corresponding to the position of said line of sight, means for introducing a lead angle of said gun relative to said line of sight, a motor controlled by said control means and said last-named means for positioning said gun about said two axes, and a motor controlled by said control means and said last-named means for positioning said support.

15. Positional control apparatus comprising a support, an object mounted on said support for movement about a pair of relatively angularly disposed axes and relative to said support, radio means for producing a signal corresponding to the position of said support relative to a source of radiant energy, motor means controlled by said signal for moving said object about said axes, and a motor controlled by said signal for moving said support.

16. Apparatus for aiming a gun comprising a support, a gun mounted on said support for movement about a pair of relatively angularly disposed axes and relative to said support, a radio sight defining a line of sight to an object, means actuated by said radio sight for determining the position of said support relative to said line of sight, motor means controlled by said means for positioning said gun about said axes, and a motor controlled by said means for positioning said support.

17. Apparatus for aiming a gun on an aircraft comprising a radio sight for defining a line of sight to a target, means responsive to said radio sight for producing signals corresponding to the position of said aircraft relative to said line of sight, a motor controlled by said means for positioning said gun, and a motor controlled by said means for operating control surfaces of said aircraft.

18. Positional control apparatus comprising a support arranged for movement about an axis thereof, an object mounted on said support for movement relative thereto, motor means for positioning said object relative to said support, motor means for positioning said support about said axis thereof, a common control means displaceable in one magnitude to control both of said motor means, and means for independently but simultaneously controlling both of said motors in accordance with the displacement of said control means.

19. Positional control apparatus comprising a support movable about a pair of axes, an object mounted on said support for movement about a pair of axes relative to said support, control means for defining a reference position, motor means for moving said object about said axes toward said reference position, and motor means for moving said support about its pair of axes toward said reference position, said control means being displaceable in one magnitude to control a first of each of said motor means and displaceable in a second magnitude to control a second of each of said motor means.

20. Postional control apparatus comprising a support movable about two independent axes, an object on said support movable relative to said support and about two independent axes corresponding to the axes of said support, a common control means, a first driving means for positioning said support about a first axis thereof, a second driving means for positioning said object relative to said support and about a first axis thereof corresponding to said first axis of the support, a third driving means for positioning said support about its second axis, and a fourth driving means for positioning said object relative to said support and about a second axis thereof corresponding to said second axis of the support, said control means being displaceable in one magnitude to control said first and second driving means and in a second magnitude to control said third and fourth driving means.

21. In a positional control system, a support movable about two independent axes, an object on said support movable relative thereto about two corresponding axes, control means for producing a first signal defining a reference position about a first pair of corresponding axes of said support and object and a second signal defining a reference position about a second pair of corresponding axes of said support and object, motors controlled by said first signal for positioning said support and object respectively about said first pair of corresponding axes thereof and motors controlled by said second signal for positioning said support and object respectively about said second pair of corresponding axes thereof.

22. Positional control apparatus comprising a support arranged for movement about an axis thereof, an object mounted on said support for movement relative thereto and about a corresponding axis, control means for producing signals defining a reference position relative to said axes, motor means controlled by said signals for positioning said object about its axis relative to said support, and motor means controlled by said signal for effecting a positioning of said support about its axis.

23. Positional control apparatus for aircraft comprising an object mounted on the aircraft for movement relative thereto, control means defining a reference direction, motor means controlled by said control means for positioning said object relative to said aircraft, and a second motor means controlled by said control means for operating a control surface of the aircraft, and means for independently but simultaneously controlling said motors respectively in accordance with the disagreement in angular position of said object and aircraft position relative to said reference direction.

24. Positional control apparatus comprising a movable support, an object mounted on said support for movement relative thereto, radiant energy-receiver means for producing a signal corresponding to the angular position of said support relative to the directional reference provided by the radiant energy and receiver means, motor means controlled by said signal for moving said object relative to said support, and a second motor means controlled by said signal for effecting movement of said support, and means for independently and simultaneously controlling said motor means respectively in accordance with the disagreement in angular position of said object and support relative to said directional reference.

References Cited in the file of this patent

UNITED STATES PATENTS

| | | |
|---|---|---|
| 1,360,664 | Miller | Nov. 30, 1920 |
| 1,387,678 | Anderson | Aug. 16, 1921 |
| 1,481,248 | Sperry | Jan. 15, 1924 |
| 1,731,776 | Henry | Oct. 15, 1929 |
| 1,880,138 | Hubl | Sept. 27, 1932 |
| 1,880,671 | Bates | Oct. 4, 1932 |
| 1,919,191 | Bates | July 25, 1933 |
| 2,109,475 | Fanning | Mar. 1, 1938 |
| 2,165,451 | Carlson | July 11, 1939 |
| 2,176,469 | Moueix | Oct. 17, 1939 |
| 2,339,521 | Ross | Jan. 18, 1944 |
| 2,409,462 | Zworykin et al. | Oct. 15, 1946 |